United States Patent
Peng et al.

(10) Patent No.: US 8,220,756 B2
(45) Date of Patent: Jul. 17, 2012

(54) MOUNTING APPARATUS FOR DATA STORAGE DEVICE

(75) Inventors: Wen-Tang Peng, Taipei Hsien (TW); Zhe Zhang, Shenzhen (CN); Jian Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 300 days.

(21) Appl. No.: 12/635,668

(22) Filed: Dec. 10, 2009

(65) Prior Publication Data

US 2011/0001031 A1    Jan. 6, 2011

(30) Foreign Application Priority Data

Jul. 2, 2009    (CN) .......................... 2009 1 0303955

(51) Int. Cl.
  *G12B 9/00*  (2006.01)
(52) U.S. Cl. ................ 248/27.1; 248/200.1; 361/679.58
(58) Field of Classification Search ................ 248/27.1, 248/221.11, 222.11, 222.12, 225.11, 27.3, 248/200.1; 361/679.58, 679.31, 679.33, 361/679.34, 679.35, 679.36, 679.37, 679.38, 361/679.39; 312/223.2, 319.2; 292/80, 84, 292/121, 102, 137, 145, 162, 163, 171, 146
See application file for complete search history.

(56) References Cited

U.S. PATENT DOCUMENTS

| | | | | |
|---|---|---|---|---|
| 6,683,785 | B1 * | 1/2004 | Chen ......................... | 361/679.33 |
| 7,254,017 | B2 * | 8/2007 | Peng et al. ............... | 361/679.33 |
| 7,782,606 | B2 * | 8/2010 | Baker et al. ............. | 361/679.39 |
| 7,924,557 | B2 * | 4/2011 | Li .............................. | 361/679.37 |
| 8,009,416 | B2 * | 8/2011 | Kang ....................... | 361/679.38 |
| 8,009,425 | B2 * | 8/2011 | Kang ....................... | 361/679.58 |
| 2008/0030946 | A1 * | 2/2008 | Lee .............................. | 361/685 |
| 2010/0187957 | A1 * | 7/2010 | Liang ........................ | 312/223.2 |
| 2010/0294905 | A1 * | 11/2010 | Peng et al. ............... | 248/222.12 |
| 2011/0074259 | A1 * | 3/2011 | Chen ........................ | 312/223.2 |
| 2011/0095153 | A1 * | 4/2011 | Zhang et al. ............. | 248/309.1 |
| 2011/0101831 | A1 * | 5/2011 | Wang et al. ............... | 312/223.1 |
| 2011/0139735 | A1 * | 6/2011 | Li ............................... | 211/26.2 |

* cited by examiner

*Primary Examiner* — Terrell McKinnon
*Assistant Examiner* — Eret McNichols
(74) *Attorney, Agent, or Firm* — Altis Law Group, Inc.

(57) ABSTRACT

A mounting apparatus includes a receiving rack, a sliding member slidably mounted to the receiving rack, a first resilient member, and a latching unit. The latching unit includes a fitting member pivotally mounted to the receiving rack, a locking member slidably received in the fitting member, and a second resilient member. The fitting member includes a resisting plate and an elastic clamping portion. The locking member faces the sliding member. A wedged protrusion protrudes from the clamping portion, operably latched with the receiving rack. The first resilient member resist against the sliding member and the fitting member. When the latching tab engages with the sidewall of the bracket, the sliding member is moved to deform the first resilient member. Thereafter, the sliding member resists the resisting plate, to block the fitting member to rotate further into the receiving rack. The wedged protrusion is incapable of latching with the receiving rack.

20 Claims, 6 Drawing Sheets

MOUNTING APPARATUS FOR DATA STORAGE DEVICE

BACKGROUND

1. Technical Field

The disclosure relates to mounting apparatuses for data storage devices, and particularly to a mounting apparatus that readily secures a data storage device in a computer enclosure.

2. Description of Related Art

Generally speaking, when a computer is assembled, a bracket is mounted in a computer enclosure, to which data storage devices will be attached, often by screws. This methodology can be tedious and time-consuming. Moreover, in this process, one or more screws can easily fall into the crowded interior of the computer enclosure, thus requiring a difficult retrieval.

DETAILED DESCRIPTION

Figure 5:
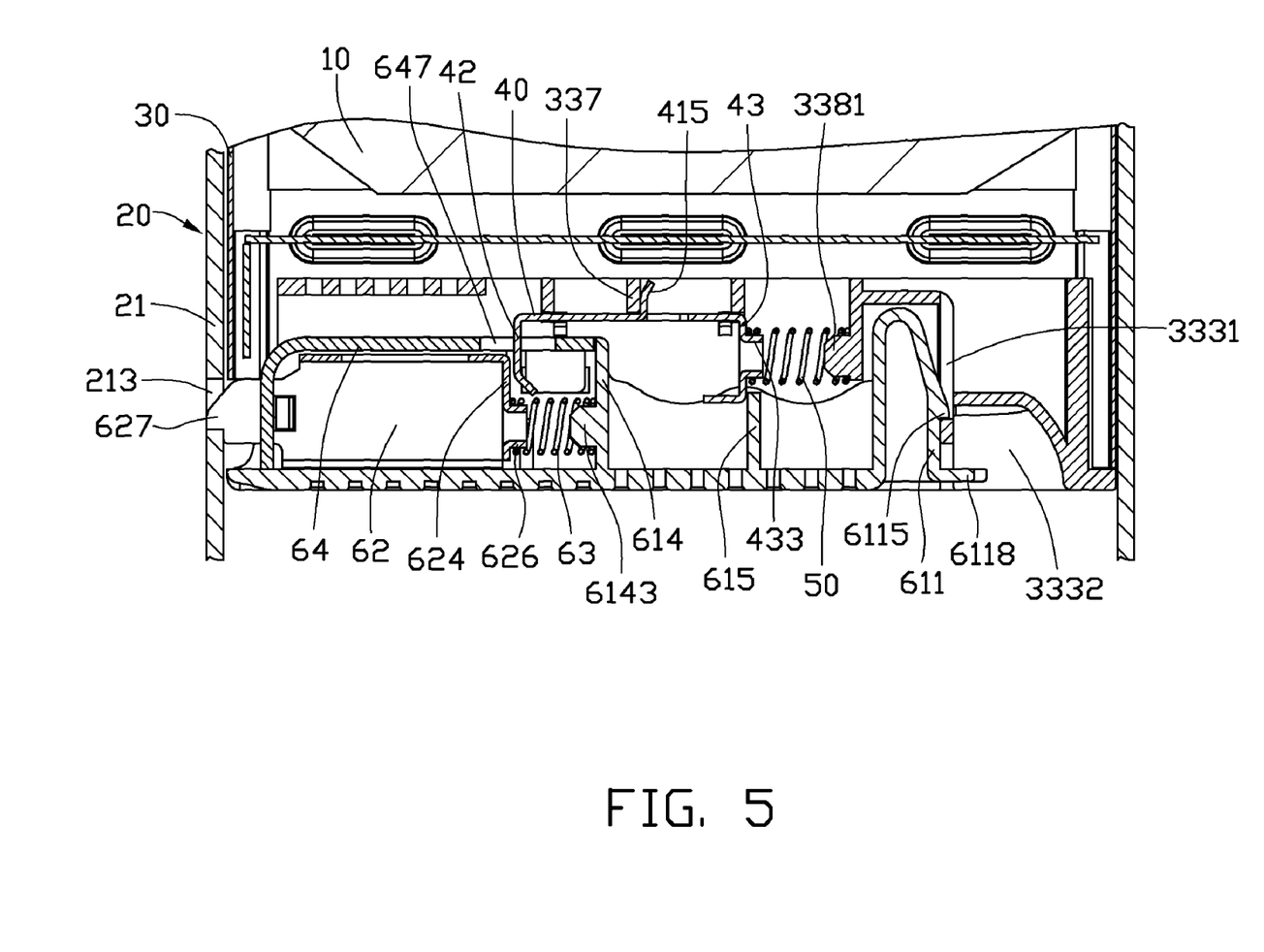
FIG. 5 is a cross-sectional view of FIG. 4, taken along the line V-V, together with a bracket for receiving the mounting apparatus.

Referring to FIG. 5, an exemplary embodiment of a mounting apparatus 1 is provided to fix a data storage device 10 to a bracket 20 fixed in a computer (not shown). The bracket 20 includes a sidewall 21 defining two clamping holes 213 aligned in a line.

Figure 1:
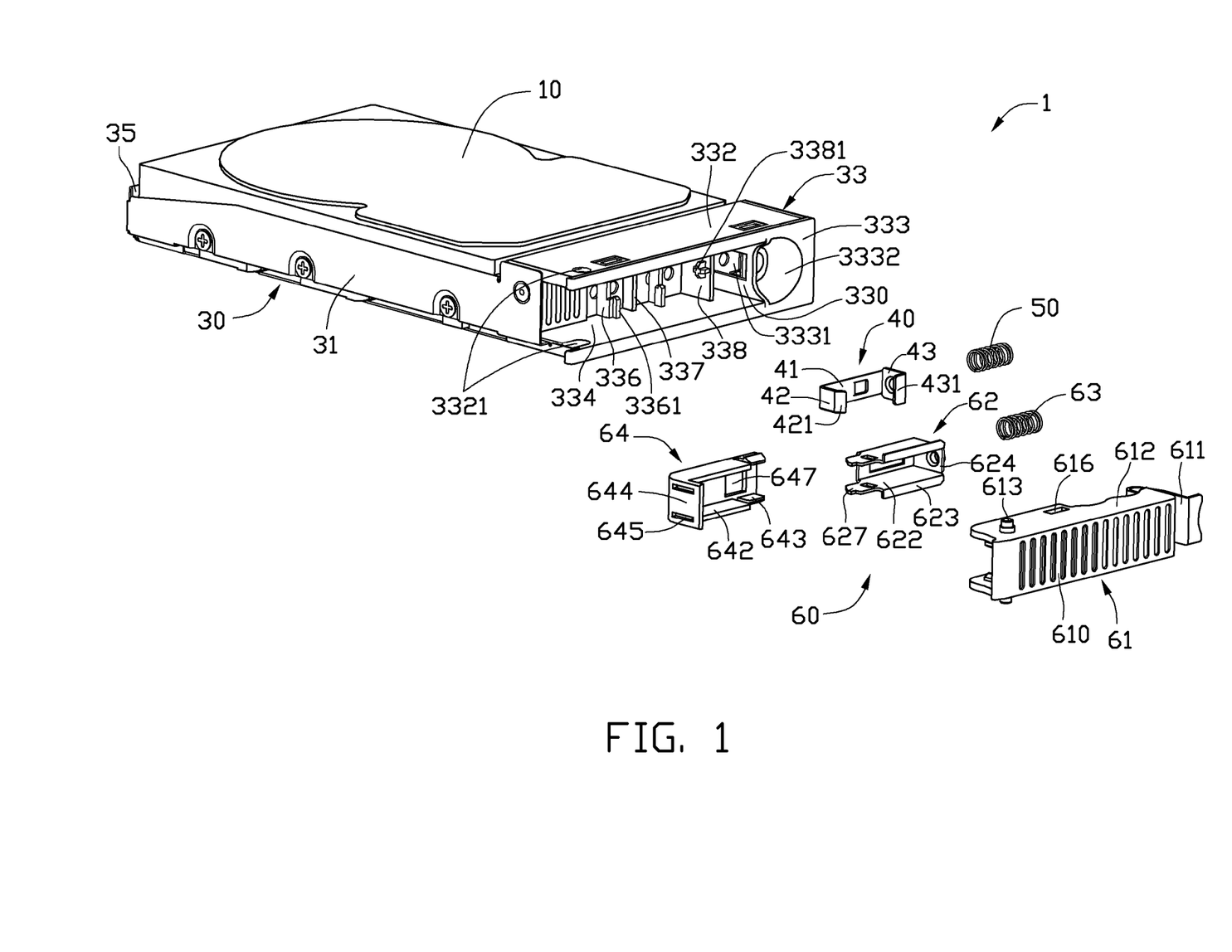
FIG. 1 is an exploded, isometric view of an exemplary embodiment of a mounting apparatus, together with a data storage device fixed therein, the mounting apparatus includes a receiving rack, a latching unit, a first resilient member, and a sliding member.

Referring to FIG. 1, the mounting apparatus 1 includes a receiving rack 30 for receiving the data storage device 10, a sliding member 40, a first resilient member 50, and a latching unit 60 pivotally mounted to the receiving rack 30. In this embodiment, the first resilient member 50 is a coil spring.

The receiving rack 30 includes opposite side plates 31 for sandwiching sidewalls of the data storage device 10, a rear plate 35 connecting rear ends of the side plates 31 for resisting against a rear side of the data storage device 10, and a fixing member 33 formed between the front ends of the side plates 31. The fixing member 33 includes opposite fixing plates 332, and a connecting part 333 perpendicularly located at one end of the fixing member 33 and connecting the fixing plates 332. A receiving groove 334 is defined in the fixing member 33. A catching notch 3332 is defined in a front side of the connecting part 333, adjacent to the receiving groove 334. The connecting part 333 includes a side plate 330 connecting to the fixing plates 332, between the receiving groove 334 and the catching notch 3332. The side plate 330 defines a matching hole 3331 communicating with the receiving groove 334 and the catching notch 3332. Two pivot holes 3321 are defined in the fixing plates 332 at a distance from the connecting part 333, correspondingly. Two parallel support boards 336 are formed in the receiving groove 334, and opposite ends of the support boards 336 are connected to the fixing plates 332. Each support board 336 is generally U-shaped, thus, a U-shaped sliding slot (not labeled) is formed in each support board 336. Each support board 336 includes opposite positioning blocks 3361 beside the sliding slot and located at the opposite ends thereof and connected to the corresponding fixing plates 332, respectively. A matching board 337 is formed in the receiving groove 334, between the support boards 336. A mounting board 338 is formed in the receiving groove 334, between one of the support boards 336 and the side plate 330 of the connecting part 333, correspondingly. A fixing post 3381 extends towards the support board 336 from the mounting board 338.

The sliding member 40 includes a main body 41, a first resisting portion 42 and a second resisting portion 43 extending perpendicular to opposite ends of a first side of the main body 41, correspondingly. A limiting block 415 (shown in FIG. 5) extends from a second side of the main body 41, opposite to the first side of the main body 41. A slanted guiding lip 421 extends obliquely towards the second resisting portion 43 from a distal end of the first resisting portion 42. A resisting tab 431 perpendicularly extends towards the first resisting portion 42 from a distal end of the second resisting portion 43. A fixing post 433 (shown in FIG. 5) protrudes from the second resisting portion 43, opposite to the resisting tab 431.

Figure 2:
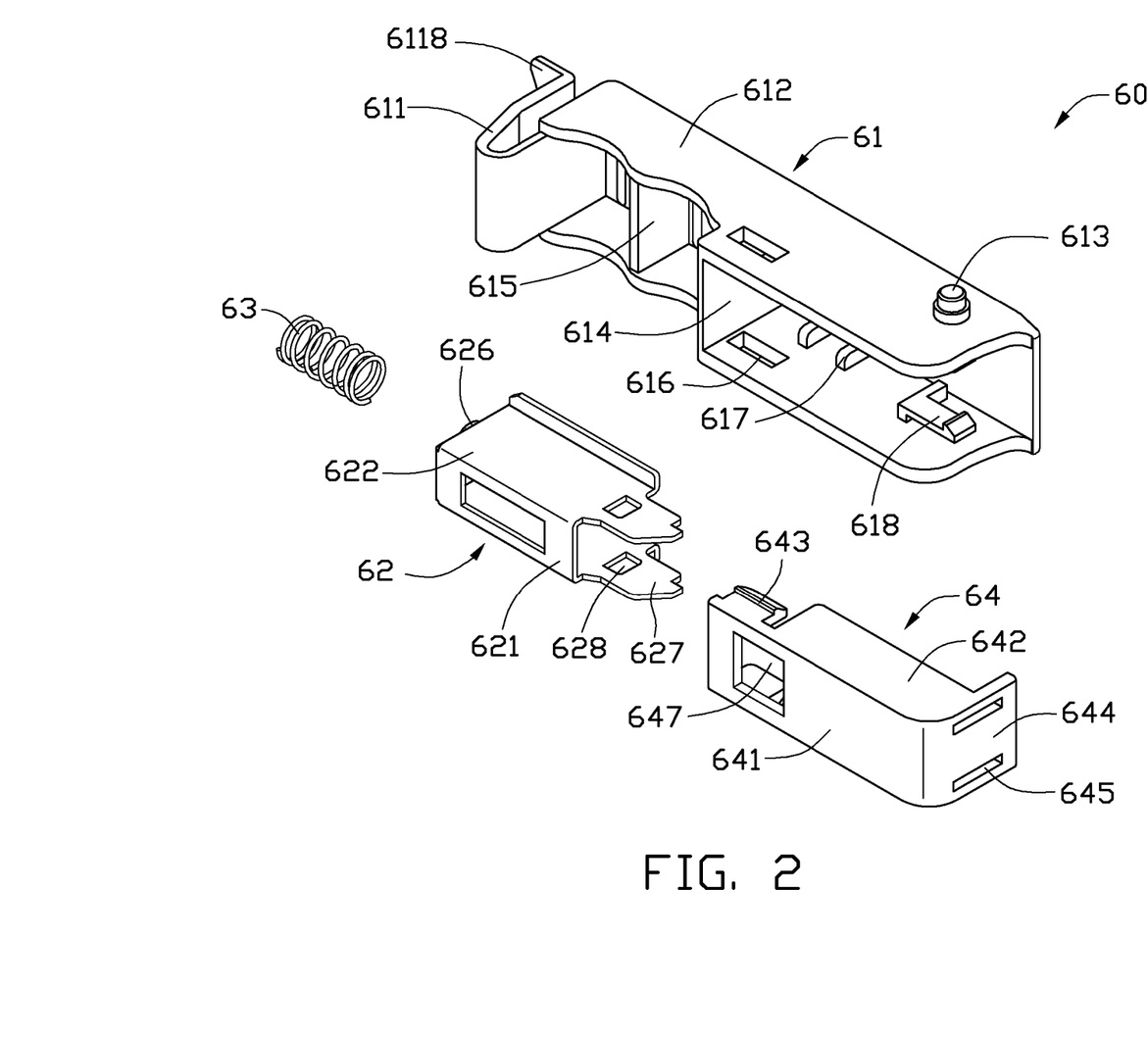
FIG. 2 is an enlarged, exploded view of the latching unit of FIG. 1, but viewed from another perspective.

Referring also to FIG. 2, the latching unit 60 includes a fitting member 61, a locking member 62, a second resilient member 63, and a positioning member 64. In this embodiment, the second resilient member 63 is a coil spring.

The fitting member 61 includes a baffle plate 610, a generally U-shaped elastic clamping portion 611 extending from a end of the baffle plate 610, and two securing panels 612 extending from opposite longitudinal edges of the baffle plate 610. An operating tab 6118 extends from a distal end of the clamping portion 611 generally parallel to the baffle plate 610, and away from the baffle plate 610. A wedged protrusion 6115 (shown in FIG. 6) protrudes from a center part of an outside of the clamping portion 611, facing the operating tab 6118. Two fixing shafts 613 extend outward from the securing panels 612, away from the clamping portion 611, respectively. A connecting board 614 is perpendicularly formed between the securing panels 612, situated in a middle portion of the fitting member 61. A resisting plate 615 parallel to the connecting board 614 is also perpendicularly formed between the securing panels 612, and the resisting plate 615 locates between the connecting board 614 and the clamping portion 611. A fixing post 6143 (shown in FIG. 6) extends from a side of the connecting board 614, away from the resisting plate 615. A hook slot 616 is defined in each securing panel 612, adjacent the connecting board 614. A plurality of positioning blocks 617 parallel to the connecting board 614 extends from an inner side of each securing panel 612, beside the hook slot 616 correspondingly. An elastic clamping hook 618 perpendicular to the connecting board 614 extends from an outmost positioning block 617. Ends of the positioning blocks 617 adjacent the baffle 610 are spaced from the baffle plate 610.

The locking member 62 includes a sidewall 621, two resisting walls 622 perpendicularly extending from opposite edges of the sidewall 621, and a connecting wall 624 perpendicularly connecting the resisting walls 622 and the sidewall 621. Two flanges 623 opposite to each other perpendicularly extend from outer edges of the resisting walls 622 away from the sidewall 621. A latching tab 627 having a slanted distal end extends from an end of each resisting walls 622, away from the connecting wall 624. Two through slots 628 are defined in the latching tabs 627, respectively. A fixing post 626 extends from the connecting wall 624, away from the latching tabs 627.

The positioning member 64 includes a main board 641 defining a sliding hole 647, and an end board 644 generally perpendicularly extending from the main board 641. The end board 644 defines two through holes 645, through which the latching tabs 627 of the locking member 62 pass. Two clamps 643 and two side boards 642 perpendicularly extend from opposite edges of the main board 641, respectively.

In assembly of the latching unit 60, the locking member 62 is received between the side boards 642 of the positioning member 64. Thus, the latching tabs 627 of the locking member 62 are inserted into the through holes 645 of the positioning member 64, respectively. The locking member 62 is received in the fitting member 61, with the flanges 623 located between the positioning blocks 617 and the baffle plate 610 of the fitting member 61 correspondingly. The clamping hooks 618 of the fitting member 61 are slidably engaged in the through slots 628 of the locking member 62 correspondingly. Two ends of the second resilient member 63 are fixed around the fixing post 626 of the locking member 62 and the fixing post 6143 of the fixing member 61. As a result, the resisting walls 622 of the locking member 62 resist against the positioning blocks 617, respectively. The clamps 643 of the positioning member 64 engage in the hook slots 616 of the fitting member 61, to retain the positioning member 64 in the fitting member 61. The second resilient member 63 is sandwiched between the connecting board 614 of the fitting member 61 and the connecting wall 624 of the locking member 62.

Figure 3:
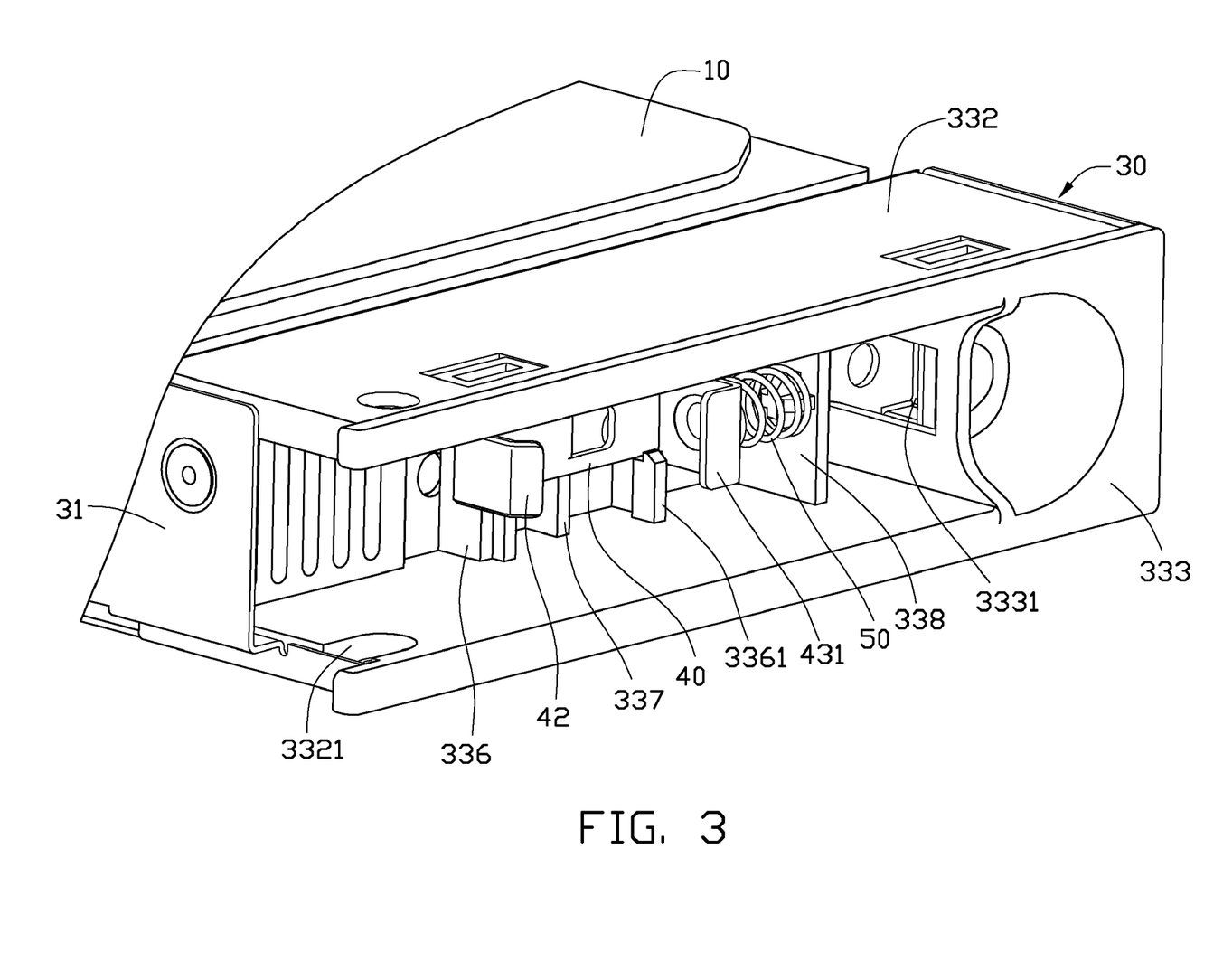
FIG. 3 is a partially assembled, isometric view of FIG. 1, and shows the first resilient member and the sliding member mounted to the receiving rack.
Figure 4:
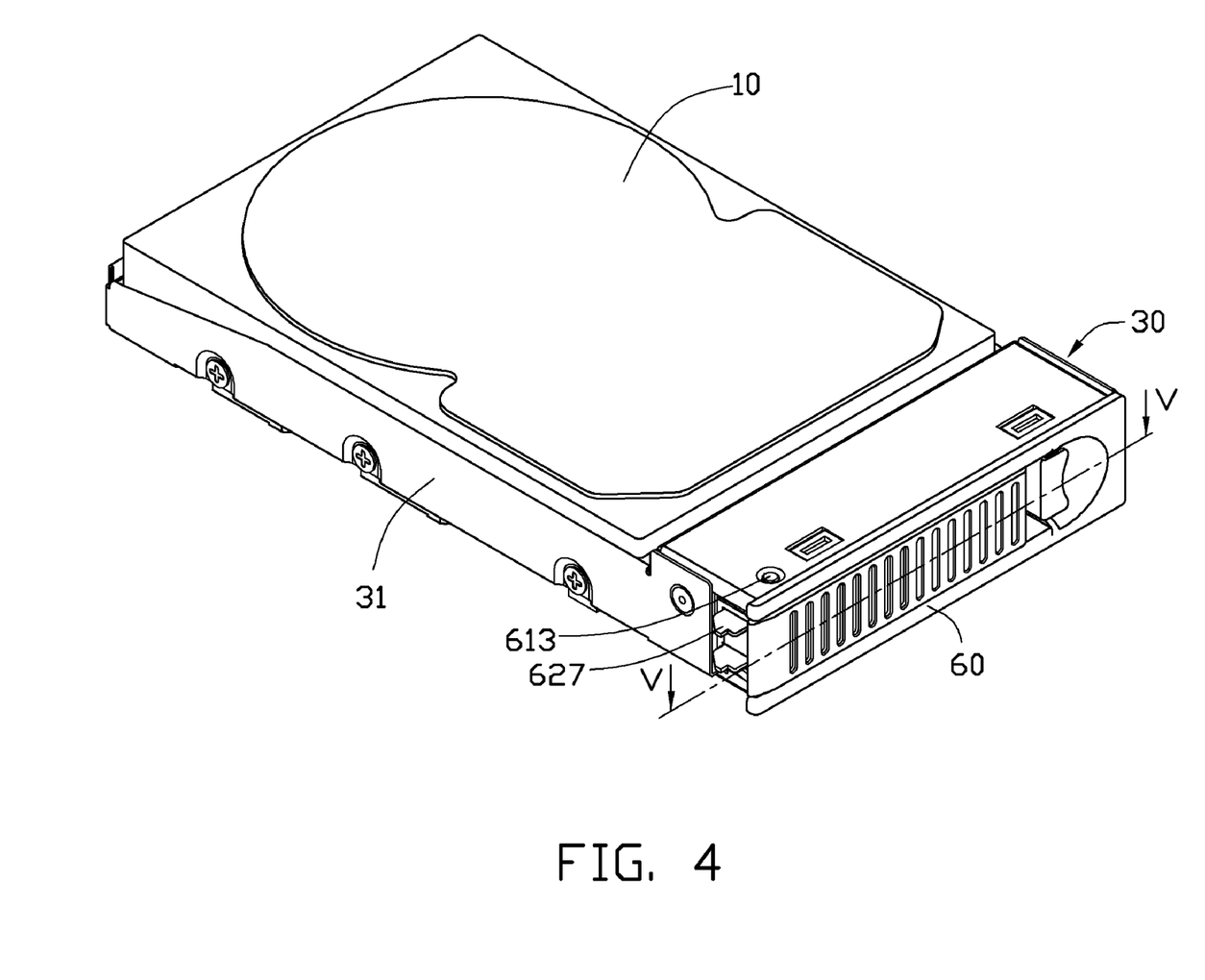
FIG. 4 is an assembled, isometric view of FIG. 1.

Referring to FIGS. 3 and 4, in assembly of the mounting apparatus 1, the sliding member 40 is slidably received in the U-shaped sliding slots of the support boards 336. Therefore, opposite ends of the main body 41 of the sliding member 40 are sandwiched between the positioning blocks 3361 of the support boards 336, with the limiting block 415 of the sliding member 40 movably resisting against the matching board 337. Opposite ends of the first resilient member 50 are sleeved on the fixing posts 3381, 433 of the receiving rack 30 and the sliding member 40, respectively. The fixing shafts 613 of the fitting member 61 engage in the pivot holes 3321 of the receiving rack 30, such that the latching unit 60 is pivotally mounted to the receiving rack 30. Afterwards, the latching unit 60 is rotated into the receiving groove 334 of the receiving rack 30, with the clamping portion 611 of the fitting member 61 received in a space between the mounting board 338 and the side plate 330, and the wedged protrusion 6115 engaging in the matching hole 3331 of the receiving rack 30. As a result, the operating tab 6118 of the fitting member 61 is received in the catching notch 3332 of the receiving rack 30. The slanted guiding lip 421 of the first resisting portion 42 of the sliding member 40 passes through the sliding hole 647 of the positioning member 64, with the first resisting portion 42 facing the connecting wall 624 of the locking member 62 (referring to FIGS. 5 and 6). The resisting plate 615 of the fitting member 61 abuts a side of the second resisting portion 43 of the sliding member 40, opposite to the resisting tab 431.

Figure 6:
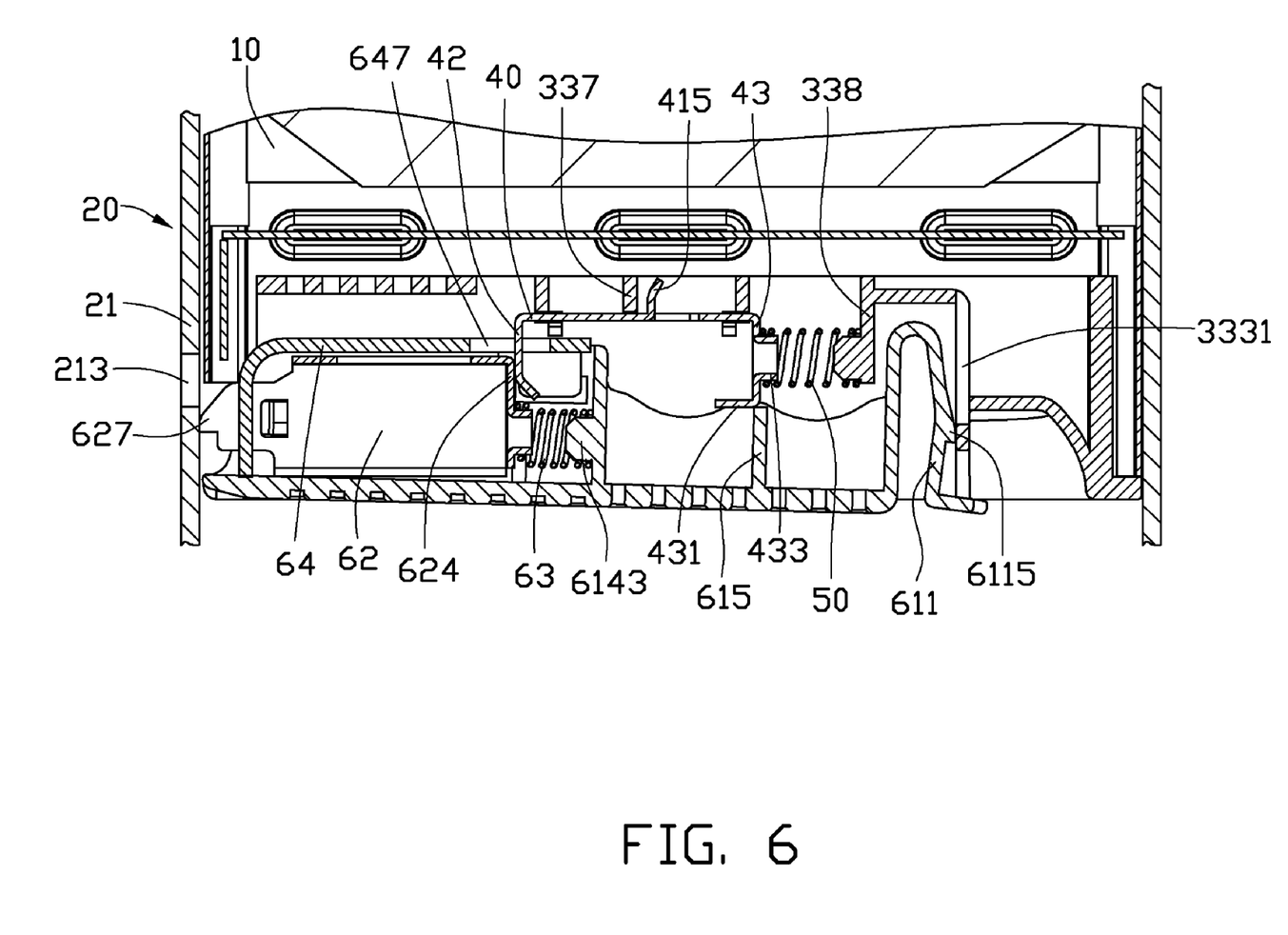
FIG. 6 is similar to FIG. 5, but shows the mounting apparatus partially mounted to the bracket.

Referring to FIGS. 5 and 6, in use, the latching unit 60 is rotated out of the receiving groove 334 of the receiving rack 30 with the data storage device 10 received therein. Then, the mounting apparatus 1 together with the data storage device 10 is moved into the bracket 20. Subsequently, the latching unit 60 is rotated into the receiving groove 334. In this process, the second resilient member 63 gradually deforms because the latching tabs 627 of the latching unit 60 resist against the sidewall 21 of the bracket 20. The connecting wall 624 of the locking member 62 pushes the first resisting portion 42 away from the sidewall 21 to deform the first resilient member 50. When the latching tabs 627 are aligned with the clamping holes 213 of the bracket 20, the elasticity of the second resilient member 63 pushes the locking member 62 towards the sidewall 21, thus, the latching tabs 627 engage in the clamping holes 213. The elasticity of the first resilient member 50 moves the sliding member 40 towards the sidewall 21, until the limiting block 415 of the sliding member 40 resists against the matching board 337 of the receiving rack 30. At the same time, the latching unit 60 is fully received in the receiving groove 334, with the wedged protrusion 6115 of the clamping portion 611 engaging in the matching hole 3331 of the receiving rack 30. Therefore, the receiving rack 30 is fixed to the bracket 20 together with the data storage device 10 and the latching unit 60. After fully assembled, if the sidewall 21 inadvertently moves away from the latching tabs 627 due to vibration or deformation of the bracket 20, the latching tabs 627 can automatically re-engage in the clamping holes 213 due the elasticity of the second resilient member 63. In additional, elasticity of the first and second resilient member 50, 63 can absorb or dampen impact or vibration of the data storage device 10.

In the aforementioned use of the mounting apparatus 1, if the latching tabs 627 of the latching unit 60 do not engage in the clamping holes 213 of the bracket 20, but abuts the sidewall 21 of the bracket 20, the second resilient member 63 deforms and the connecting wall 624 of the locking member 62 pushes the first resisting portion 42 of the sliding member 40 away from the sidewall 21 to deform the first resilient member 50. In this state, the latching unit 60 is not capable of rotating into the receiving groove 334 to allow the wedged protrusion 6115 of the clamping portion 611 to engage in the matching hole 3331 of the receiving rack 30. In this scenario, the resisting tab 431 of the second resisting portion 43 of the sliding member 40 will block the resisting plate 615 of the fitting member 61. Thus, the latching unit 60 cannot rotate further into in the receiving groove 334 of the receiving rack 30. The clamping portion 611 of the latching unit 60 can not be fully received in the space between the mounting board 338 and the side plate 330. As a result, the wedged protrusion 6115 can not engage in the matching hole 3331 of the receiving rack 30. This will alarm users that the data storage device 10 is not been fixed to the bracket 20 in position.

To remove the data storage device 10 from the bracket 20, the operating tab 6118 of the fitting member 61 is operated to release the wedged protrusion 6115 of the clamping portion 611 from the matching hole 3331 of the receiving rack 30. The fitting member 61 is rotated away from the receiving rack 30. Then the fitting member 61 is drawn outside from the receiving groove 334 of the receiving rack 30, to eject the latching tabs 627 of the latching unit 60 from the clamping holes 213 of the bracket 20. Accordingly, the receiving rack 30 is drawn out from the bracket 20. Then, the data storage device 10 is thus readily removed from the bracket 20.

In other embodiments, the positioning member 64 of the latching unit 60 may be omitted.

Obviously, the locking member 62 of the latching unit 60 can include one latching tab 627 or a plurality of latching tabs 627. Therefore, the sidewall 21 of the bracket 20 can defined one clamping hole 213 or a plurality of clamping holes 213, corresponding to the corresponding latching tab 627.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the mounting apparatus comprising:
   a bracket comprising a sidewall defining at least one clamping hole;
   a receiving rack configured to receive the data storage device;
   a sliding member slidably mounted to the receiving rack;
   a first resilient member; and
   a latching unit comprising:
      a fitting member pivotally mounted to the receiving rack, the fitting member comprising a resisting plate, and an elastic clamping portion, a wedged protrusion protruding from the clamping portion, and operably latched with the receiving rack, opposite ends of the first resilient member resisting against the sliding member and the receiving rack;
      a locking member slidably received in the fitting member, and facing the sliding member, the locking member comprising at least one latching tab correspondingly engaged in the at least one clamping hole; and
      a second resilient member, opposite ends of the second resilient member resisting against the locking member and the fitting member;
   wherein when the at least one latching tab is moved away from the at least one clamping hole of the bracket to engage with the sidewall of the bracket, the sliding member is moved by the locking member to deform the first resilient member; thereafter, the sliding member resists the resisting plate, to block the fitting member from rotating further into the receiving rack, the wedged protrusion is incapable of latching with the receiving rack.

2. The mounting apparatus of claim 1, wherein the receiving rack defines a receiving groove, the fitting member is pivotally received in the receiving groove, the at least one latching tab is exposed out from the receiving groove.

3. The mounting apparatus of claim 2, wherein the receiving rack comprises opposite side plates for sandwiching the data storage device, and a fixing member formed between the side plates, the receiving groove is U-shape and defined in the fixing member.

4. The mounting apparatus of claim 3, wherein the fixing member comprises two opposite fixing plates each defining a pivot hole, the receiving groove is formed between the fixing plates, two fixing shafts extend from the fitting member, to engage in the pivot hole, respectively.

5. The mounting apparatus of claim 4, wherein the fixing member further comprises a side plate connecting to the fixing plates, the side plate defines a matching hole, the wedged protrusion is capable of engaging in or disengaging from the matching hole.

6. The mounting apparatus of claim 4, wherein the receiving rack further comprises two parallel support boards formed in the receiving groove, and connected to the fixing plates, each support board is generally U-shaped, with a U-shaped sliding slot formed therein, the sliding member is slidably received in the sliding slot of the support boards.

7. The mounting apparatus of claim 6, wherein the receiving rack further comprises a matching board formed in the receiving groove, between the support boards, a limiting block extends from the sliding member, and capable of resisting against the matching board.

8. The mounting apparatus of claim 6, wherein the locking member comprises a connecting wall, each support board of the receiving rack comprises two opposite positioning blocks formed beside the sliding slot; the sliding member comprises a main body, opposite ends of the main body are slidably sandwiched between the positioning blocks of the support boards, a first resisting portion extends from the main body facing the connecting wall, and the connecting wall is capable of pushing the first resisting portion to move along the support boards.

9. The mounting apparatus of claim 8, wherein a fixing post extends from the connecting wall, the fitting member comprises a connecting board, a fixing post extends from the connecting board, opposite ends of the second resilient member are fitted about the fixing posts of the connecting wall and the connecting board, respectively.

10. The mounting apparatus of claim 9, wherein the locking member further comprises two resisting walls extending from opposite ends of the connecting wall, the at least one latching tab extends from at least one of the corresponding resisting walls, away from the connecting wall.

11. The mounting apparatus of claim 8, wherein a second resisting portion abutting the resisting plate extends from the main body, opposite to the first resisting portion, a resisting tab perpendicularly extends towards the first resisting portion from a distal end of the second resisting portion, the resisting plate is capable of resisting the resisting tab to block the fitting member further to rotate into the receiving groove.

12. The mounting apparatus of claim 11, wherein a fixing post extends from the second resisting portion, a mounting board is formed in the receiving groove, and a fixing post extends from the mounting board, opposite ends of the first resilient member are fitted about the fixing posts of the second resisting portion and the mounting board, respectively.

13. A mounting apparatus for a data storage device, the mounting apparatus comprising:
   a receiving rack to receive the data storage device;
   a sliding member slidably mounted to the receiving rack, the sliding member comprises a first resisting portion and a second resisting portion opposite to the first resisting portion;
   a first resilient member; and
   a latching unit comprising:
      a fitting member pivotally mounted to the receiving rack, the fitting member comprising an elastic clamping portion, a wedged protrusion protruding from the clamping portion, and operably latched with the receiving rack, opposite ends of the first resilient member resisting against the second resisting portion and the receiving rack;
      a locking member slidably received in the fitting member; the locking member comprising a connecting wall facing the second resisting portion; and
      a second resilient member, opposite ends of the second resilient member resisting against the fitting member and the locking member;
   wherein when the locking member is moved to deform the second resilient member, the connecting wall resists against the first resisting portion to move the sliding member, such that the first resilient member is deformed, to absorb or dampen impact or vibration of the data storage device.

14. The mounting apparatus of claim 13, wherein the locking member comprises at least one latching tab, the receiving rack comprises opposite side plates for sandwiching the data storage device, and a fixing member formed between the side plates, an U-shape receiving groove is defined in the fixing member to receive the fitting member, with the at least one latching tab exposing out of the receiving groove.

15. The mounting apparatus of claim 14, wherein the receiving rack further comprises two parallel support boards formed in the receiving groove, and connected to the fixing plates, each support board is generally U-shaped, with a U-shaped sliding slot formed therein, the sliding member is slidably received in the sliding slot of the support boards.

16. The mounting apparatus of claim 15, wherein the receiving rack further comprises a matching board formed in the receiving groove between the support boards, each support board of the receiving rack comprises two opposite positioning blocks formed beside the sliding slot, the sliding member further comprises a main body slidably sandwiched between the positioning blocks of the support boards, the first and second resisting portion extends from opposite ends of the main body, a limiting block extends from the main body is capable of resisting against the matching board.

17. The mounting apparatus of claim 14, wherein the fixing member comprises two opposite fixing plates each defining a pivot hole, the receiving groove is formed between the fixing plates, the fitting member further comprises a baffle plate, and two securing panels extending from opposite longitudinal edges of the baffle plate, respectively, the elastic clamping portion extends from an end of the baffle plate; a fixing shaft extends from each of the securing panels, to engage in the corresponding pivot hole.

18. The mounting apparatus of claim 17, wherein the fitting member further comprises a resisting plate perpendicularly formed between the securing panels, a resisting tab perpendicularly extends towards the first resisting portion from a distal end of the second resisting portion, the resisting tab of the sliding member resists the resisting plate, to block the fitting member from rotating further into the receiving rack.

19. The mounting apparatus of claim 17, wherein the fixing member further comprises a side plate connecting to the fixing plates, the side plate defines a matching hole, the wedged protrusion is capable of engaging in or disengaging from the matching hole.

20. The mounting apparatus of claim 13, wherein the locking member further comprises two resisting walls extends from opposite ends of the connecting wall, at least one latching tab extends from the corresponding resisting wall, away from the connecting wall, to be engaged in a clamping hole of a bracket.

* * * * *